United States Patent
Wilson et al.

(10) Patent No.: US 7,827,048 B2
(45) Date of Patent: Nov. 2, 2010

(54) SYSTEMS AND METHODS FOR TESTING A DELIVERY SYSTEM

(75) Inventors: James D. Wilson, Collierville, TN (US); Jacquelynn Estes, Warrenton, VA (US)

(73) Assignee: United States Postal Service, Washington, DC (US)

( * ) Notice: Subject to any disclaimer, the term of this patent is extended or adjusted under 35 U.S.C. 154(b) by 1428 days.

(21) Appl. No.: 10/362,123

(22) PCT Filed: Sep. 6, 2001

(86) PCT No.: PCT/US01/27564
§ 371 (c)(1), (2), (4) Date: Feb. 21, 2003

(87) PCT Pub. No.: WO02/21391
PCT Pub. Date: Mar. 14, 2002

(65) Prior Publication Data
US 2003/0208370 A1    Nov. 6, 2003

Related U.S. Application Data

(60) Provisional application No. 60/231,309, filed on Sep. 8, 2000.

(51) Int. Cl.
*G06F 9/44* (2006.01)
*G06Q 30/00* (2006.01)

(52) U.S. Cl. .......................................... 705/7; 705/333

(58) Field of Classification Search ...................... 705/1, 705/11, 333, 7
See application file for complete search history.

(56) References Cited

U.S. PATENT DOCUMENTS

| 4,752,675 | A | | 6/1988 | Zetmeir |
| 5,909,669 | A | * | 6/1999 | Havens ........................ 705/11 |
| 5,917,925 | A | | 6/1999 | Moore |
| 5,925,864 | A | * | 7/1999 | Sansone et al. ............. 235/375 |
| 5,971,587 | A | | 10/1999 | Kato et al. |
| 6,285,916 | B1 | | 9/2001 | Kadaba et al. |
| 6,338,042 | B1 | * | 1/2002 | Paizis .......................... 705/11 |
| 6,810,383 | B1 | * | 10/2004 | Loveland ....................... 705/9 |
| 6,970,831 | B1 | * | 11/2005 | Anderson et al. ............. 705/11 |
| 2005/0246359 | A1 | * | 11/2005 | Robbins ..................... 707/100 |

* cited by examiner

*Primary Examiner*—Jamisue A Plucinski
(74) *Attorney, Agent, or Firm*—Finnegan, Henderson, Garabow, Garrett & Dunner, LLP

(57) ABSTRACT

A survey is placed into an envelope containing an address label and a tracking indicia. The address label indicates an old address of a recipient. The envelope containing the survey is routed through a delivery system. The delivery system is configured to sense the tracking indicia as it passes through the elements of the delivery system thus tracking the movement of the envelope through the delivery system. The envelope containing the survey is sent through the delivery system to the plant supporting the old address. The recipient, however, no longer resides at the old address and now resides at a new address. The envelope containing the survey is forwarded through the delivery system to the plant supporting the new address. Once the recipient receives and completes the survey, survey is sent to the system operator for analysis.

20 Claims, 5 Drawing Sheets

SYSTEMS AND METHODS FOR TESTING A DELIVERY SYSTEM

RELATED APPLICATION

Under provisions of 35 U.S.C. §119(e), the Applicants claim the benefit of U.S. provisional application No. 60/231,309, filed Sep. 8, 2000, which is incorporated herein by reference.

DESCRIPTION OF THE INVENTION

1. Technical Field

The present invention relates generally to systems and methods for testing a delivery system. More particularly, the present invention relates to systems and methods for tracking a survey through a delivery system and analyzing the tracking results and the survey results.

2. Background

The need to track a delivery operation when a recipient has a new delivery address has become a common need for many organizations. More specifically, comparing a delivery system's performance against the recipient's expectations when the recipient's delivery address has changed has become a critical measurement. This is because in an increasingly competitive environment, meeting and exceeding the expectations of those who receive a service is essential for a service provider.

For example, a mail delivery system operator may discover that a disproportionate number of complaints stem from the situation where the recipient's delivery address has changed, yet mail sent to the recipient is addressed to a previous address. The complaints may include slow forwarded mail delivery to the new address or total delivery failure. Though the delivery address has changed, the mail recipient has certain expectations for the mail delivery system operator. Such expectations may include a belief that the delivery system operator will insure that the mail addressed to a previous address will be delivered to the new address. Of course, there are as many different expectation levels as there are recipients. Accordingly, tracking the delivery of forwarded mail and a recipient's expectation level associated with the delivery remains an elusive goal.

One solution to the forwarded mail tracking and recipient expectation measurement problem is to use a tracking system wherein a piece of forwarded mail is manually tracked through the delivery system. Once the mail is delivered, the recipient could be interviewed and the recipient's level of satisfaction could be measured and recorded. Manually tracking a piece of forwarded mail through the delivery system, however, is extremely time consuming and burdensome. Thus, there remains a need for a management tool that allows an organization to easily track delivery when a recipient has a new delivery address. In addition, there remains a need for a management tool that compares the delivery system's performance against the recipient's expectations when the recipient's delivery address has changed.

SUMMARY OF THE INVENTION

In accordance with the current invention, a delivery system testing method and system are provided that avoid the problems associated with prior art delivery testing systems as discussed herein above.

In one aspect, a method for testing a delivery system consistent with the invention includes receiving a first data set corresponding to the results of a survey and a second data set containing process indicators corresponding to the survey's movement through the delivery system. Once the first data set and second data set are received, the method includes analyzing the first data set and the second data set.

In another aspect, a system for testing a delivery system consistent with the invention includes a first data set comprising results of a survey, a second data set comprising process indicators corresponding to movement of the survey through the delivery system, and a controller configured to analyze the first data set and the second data set.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings.

DETAILED DESCRIPTION OF THE PREFERRED EMBODIMENTS

Figure 1:
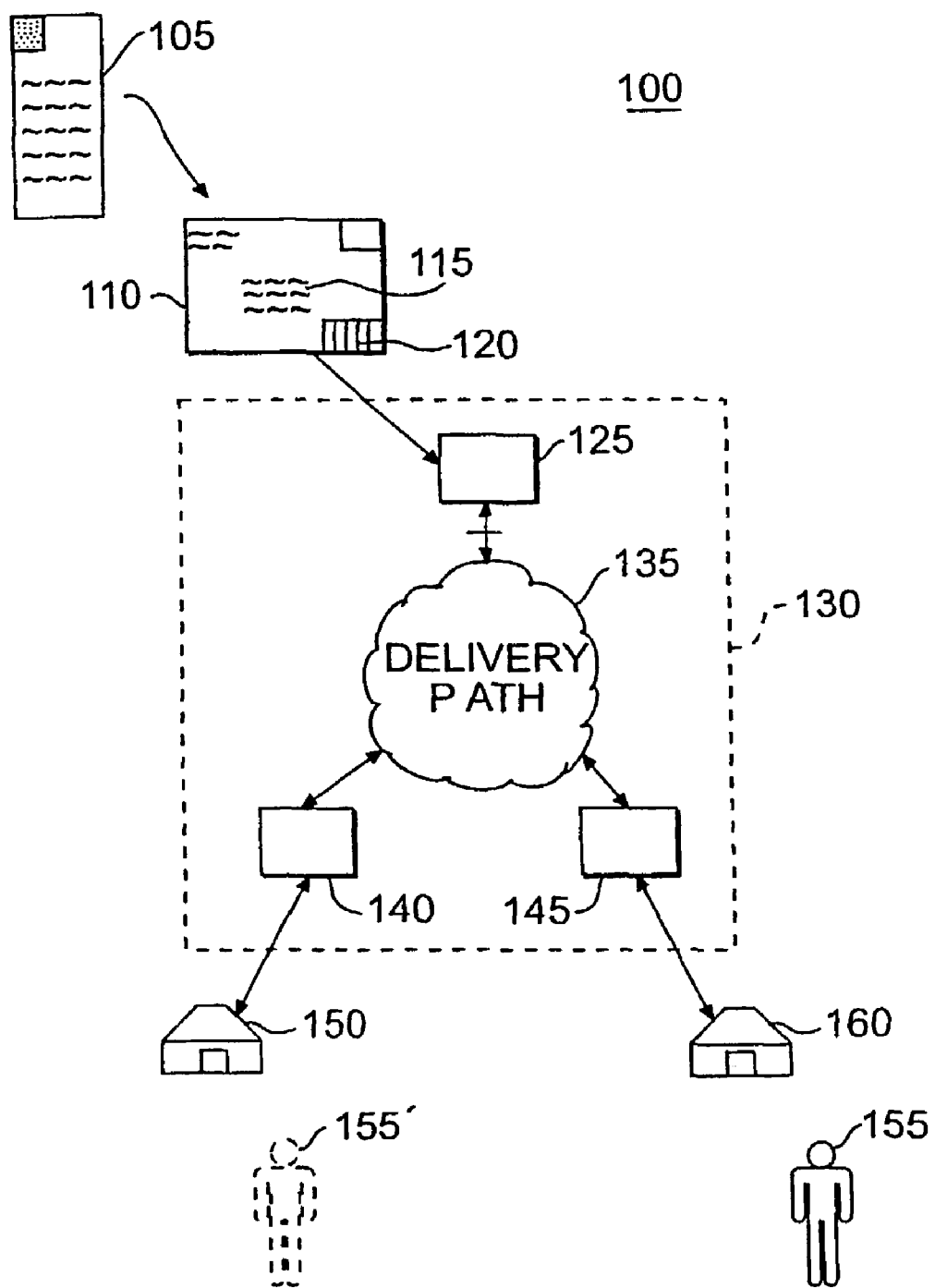
FIG. 1 is a functional block diagram of a system for testing a delivery system consistent with the present invention.

Reference will now be made to various embodiments according to this invention, examples of which are shown in the accompanying drawings and will be obvious from the description of the invention. In the drawings, the same reference numbers represent the same or similar elements in the different drawings whenever possible.

Broadly stated, the invention is a system and method for testing a delivery system. More particularly, the present invention provides for tracking a survey through a delivery system and analyzing the tracking results and the survey results.

Referring to FIG. 1, an embodiment of the present invention provides for placing survey 105 into envelope 110. Envelope 110 contains address label 115 and a tracking indicia 120. Address label 115 indicates old address 150 of recipient 155. Envelope 110 containing survey 105 is routed through delivery system 130. Delivery system 130 comprises a system operator plant 125, delivery path 135, old address plant 140 and new address plant 145. Delivery path 135 comprises a plurality of plants similar to system operator plant 125, old address plant 140 and new address plant 145. The plants within delivery path 135 contain, among other things, automated systems and sorting equipment and are designed to receive and process a plurality of items. Delivery system 130 is configured to sense tracking indicia 120 as it passes through the elements of delivery system 130, thus tracking the movement of envelope 110 through delivery system 130 and providing tracking information such as, for example, the date and time that an item passed through a particular automated operation or sorter within a given plant of delivery system 130.

Envelope 110 containing survey 105 is sent through delivery system 130 to old address plant 140. Recipient 155, however, no longer resides at old address 150 and now resides at new address 160. Envelope 110 containing survey 105 is then forwarded through delivery system 130 to new address plant 145 according to existing delivery forwarding procedures. Once recipient 155 receives and completes survey 105, survey 105 is sent to the system operator (not shown) for analysis.

Overview of the Method for Testing a Delivery System

Figure 2:
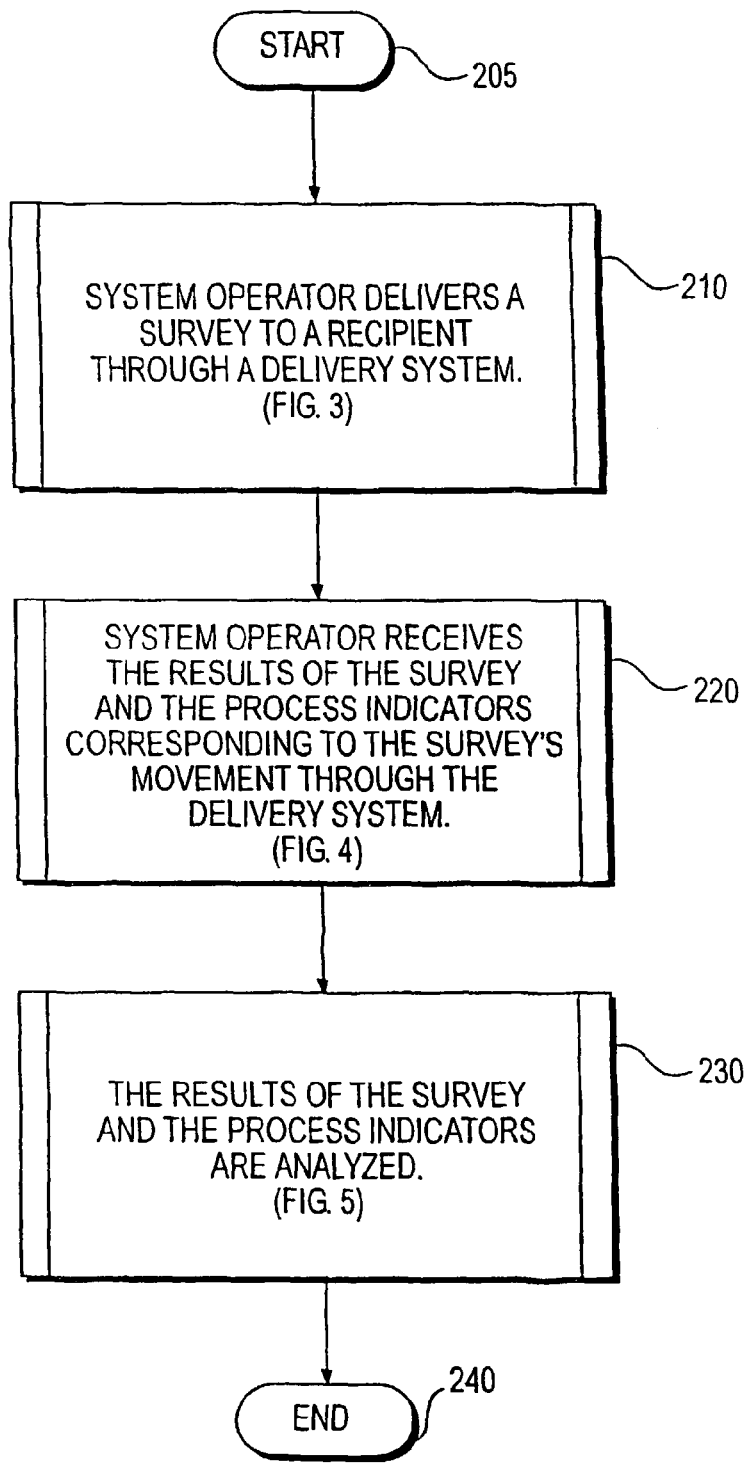
FIG. 2 is a flow chart of a delivery system testing method consistent with the present invention.

FIG. 2 is a flow chart setting forth the general stages involved in an exemplary method 200 for testing delivery system 130. The implementation of the stages of method 200 in accordance with an exemplary embodiment of the present invention will be described in greater detail in FIG. 3 through FIG. 5.

Figure 3:
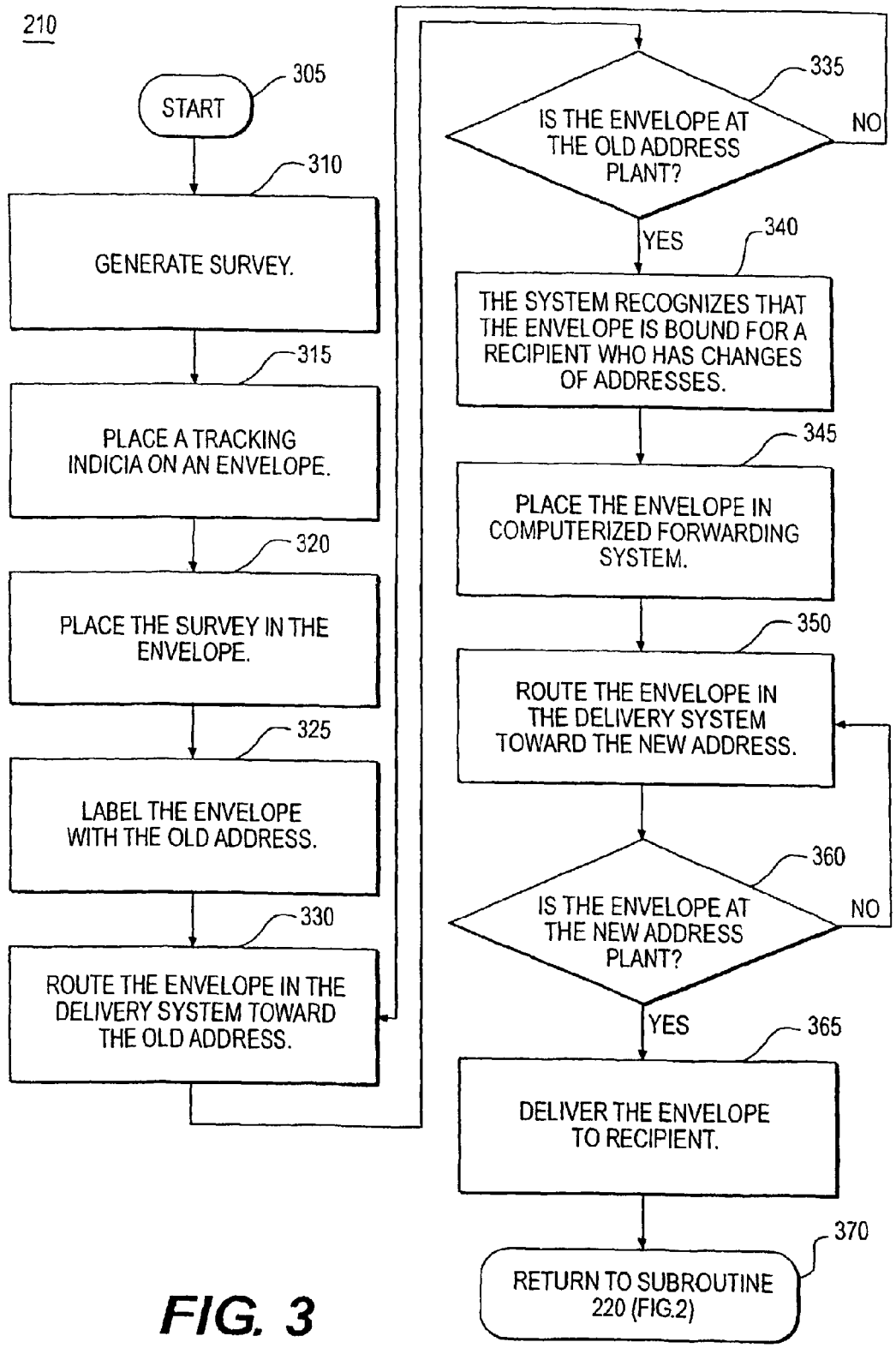
FIG. 3 is a flow chart of a subroutine, used in the method of FIG. 2, for delivering a survey through a delivery system.
Figure 4:
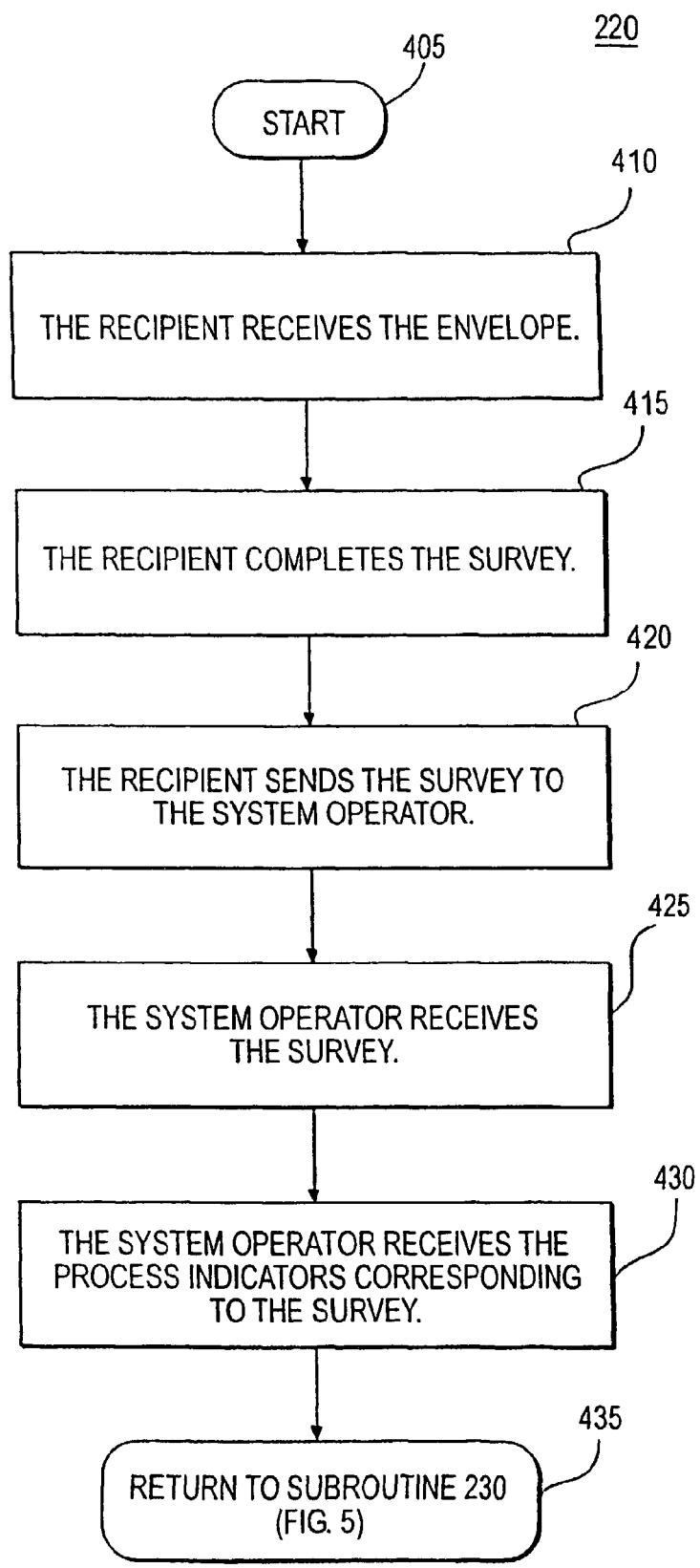
FIG. 4 is a flow chart of a subroutine, used in the method of FIG. 2, for receiving a survey by a system operator.
Figure 5:
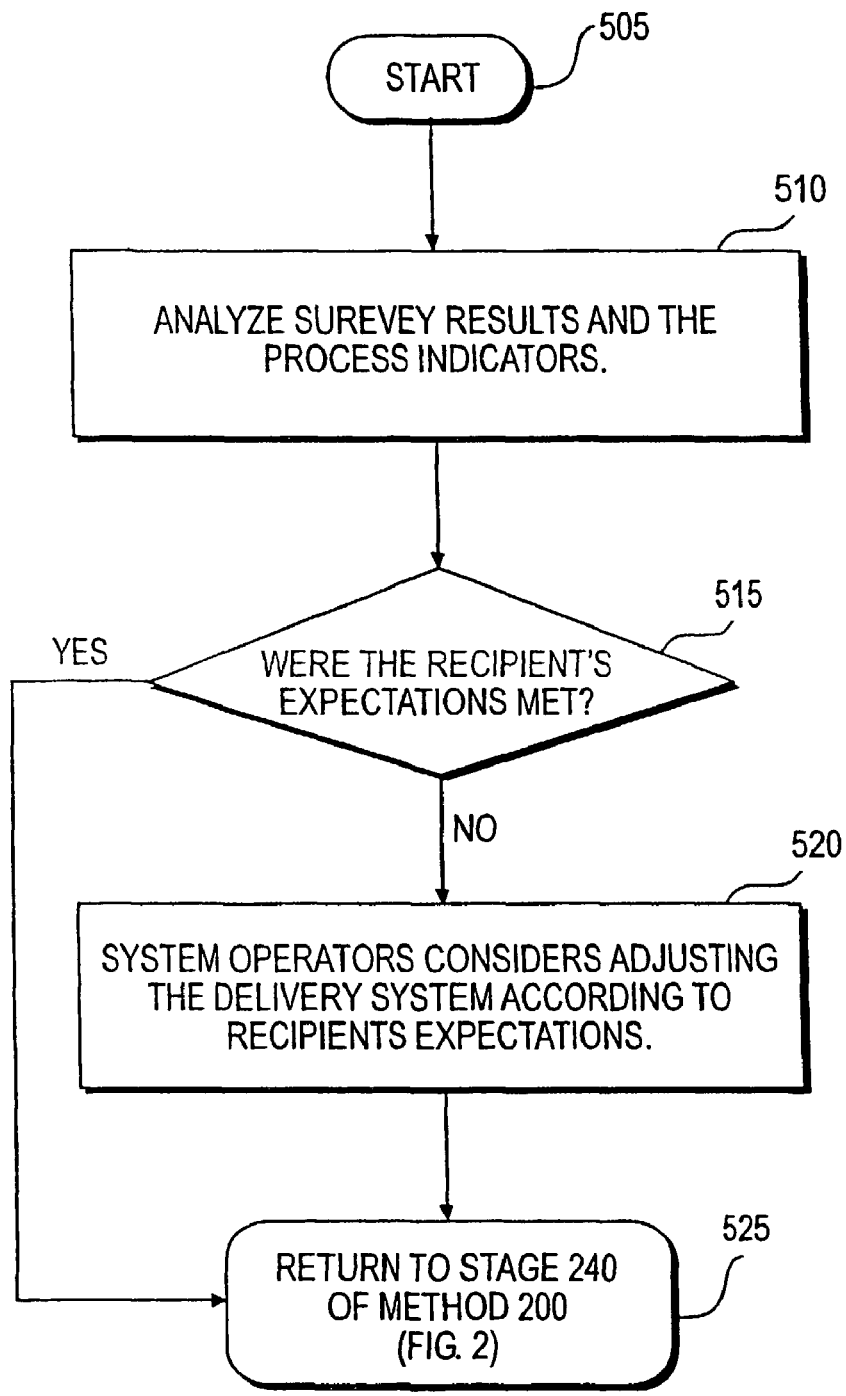
FIG. 5 is a flow chart of a subroutine, used in the method of FIG. 2, for analyzing the results of the survey.

Exemplary method 200 begins at starting block 205 and proceeds to subroutine 210 where the system operator delivers survey 105 to recipient 155 through delivery system 130. The stages comprising subroutine 210 are shown in FIG. 3 and will be described in greater detail below. Next, the method proceeds to subroutine 220 where the system operator receives the results of survey 105 and process indicators. The process indicators correspond to tracking information of the movement of survey 105 through delivery system 130. The stages of subroutine 220 are shown in FIG. 4 and will be described in greater detail below. The method continues to subroutine 230 where the results of survey 105 and the process indicators are analyzed. The stages of subroutine 230 are shown in FIG. 5 and will be described in greater detail below. From subroutine 230, exemplary method 200 ends at stage 240.

System Operator Delivers a Survey to a Recipient

Turning now to FIG. 3, describing the exemplary subroutine 210 from FIG. 2 in which the system operator delivers survey 105 to recipient 155 through delivery system 130, delivery system 130 in the present embodiment comprises a plurality of plants designed to receive and process a plurality of mailpieces, such as parcels, packages, or letters. Those skilled in the art, however, will appreciate that many other types of items may be received and processed through delivery system 130. The plants within delivery system 130 may contain, among other things, automated systems and sorting equipment located at a plurality of locations.

In executing their function, the plants comprising delivery system 130 process the items received by checking the delivery address entered on a particular item. The item is routed to the next most appropriate plant in route to the plant that serves the delivery address, according to established procedures. The items are routed from plant to plant wherein the item efficiently converges on the plant that serves the delivery address indicated on the item. Throughout this process, delivery system 130 tracks the progress of the items through delivery system 130, generating tracking information including, for example, the date and time that an item passed through a particular automated operation or sorter within a given plant. Other types of tracking information may be included. The data set corresponding to all the tracking information for a particular item designated by its tracking indicia is referred to as that particular item's "process indicators".

Subroutine 210 begins at starting block 305 and advances to stage 310 where survey 105 is generated. Survey 105 may be generated by either the system operator or an outside entity, such as a consultant. The concept of survey 105 is to capture recipient satisfaction data specific to a recent forwarding experience. This is done by a change-of-address record submitted by the recipient and the process indicators generated by the survey's tracking indicia as survey 105 moves through delivery system 130. This analysis is discussed in greater detail with respect to FIG. 5.

Survey 105 may comprise a short questionnaire asking the recipient's experience and perceptions of the system operator's forwarding service. For example, the survey may include questions regarding: whether the recipient is aware of the system operator's change-of-address web site, whether the recipient filed a change-of-address with the system operator before or after they moved, how the recipient filed the change-of-address, the ease of understanding and completing the change-of-address form, whether the recipient received a welcome kit, the expectations regarding promptness of start-up and forwarding time, and whether or not their mail was forwarded accurately.

From stage 310, subroutine 210 continues to stage 315 where a tracking indicia 120 is placed on envelope 110. The tracking indicia 120 may comprise a bar code or a PLANET code. A bar code is a printed code used for recognition by a bar code scanner (reader). Traditional one-dimensional bar codes use the bar's width to encode a product or account number. Two-dimensional bar codes, such as PDF417, MAXICODE and DATAMATRIX, are scanned horizontally and vertically and hold considerably more data. Generally, PDF417 is widely used for general purposes, MAXICODE is used for high-speed sorting, and DATAMATRIX is used for marking small parts.

In addition, the tracking indicia 120 may comprise a PLANET code. Historically, system operators sorted flat mail using POSTNET, a 12-digit barcode consisting of alternating long and short bars indicating the destination of, for example, a mailpiece. Responding to the expanding needs of users, particularly heavy volume users, PLANET code was developed on the foundation of the existing technical infrastructure. The PLANET Code is the opposite of the current POSTNET codes, reversing long bars for short and short bars for long. This innovation offers the convenience of a bar code that is easily applied using current bar-coding methods, and is readily scanned by the high-speed automation equipment already located in the plurality of plants comprising delivery system 130.

Like the POSTNET code, the PLANET code has 12 digits and consists of tall and short bars. The first two digits identify the service. The next nine digits identify the recipient. The twelfth digit is a check-sum digit that helps to correct errors. This digit is the number that, when added to the sum of the other digits, results in a multiple of ten. The PLANET symbology is the inverse of POSTNET in that; 1) each POSTNET digit has two tall and three short bars, 2) each PLANET digit has three tall and two short bars, 3) PLANET also supports alpha encoding, and 4) two-digit numeric combinations can be used to represent the entire alphabet. Those skilled in the art, however, will appreciate that many other types of tracking indicia may be employed.

Once the tracking indicia 120 is placed on envelope 110 in stage 315, subroutine 210 advances to stage 320 where survey 105 is placed in envelope 110. After survey 105 is placed in envelope 110 in stage 320, subroutine 210 continues to stage 325 where envelope 110 is labeled with address label 115. Address label 115 indicates recipients old address 150, which was the recipient's address prior to moving. Once envelope 110 is labeled with address label 115 in stage 325, subroutine 210 advances to stage 330 where envelope 110 is routed in delivery system 130 toward old address 150. This routing comprises routing envelope 110 from plant to plant within delivery system 130 wherein envelope 110 efficiently converges on old address plant 140. Old address pant 140 is the plant within delivery system 130 that serves delivery address labeled on envelope 110. Throughout this process, the delivery system tracks the progress of the items through delivery system 130 generating a data set which includes tracking information as previously described.

After envelope 110 is routed in delivery system 130 toward old address 150 in stage 330, subroutine 210 continues to decision block 335 where it is determined if envelope 110 is at old address plant 140. This is done at each plant traversed by envelop 110 during the routing process. If envelope 110 is not at old address plant 140, subroutine 210 repeats stage 330 and continues to route envelope 110 in delivery system 130 toward old address 150. If at decision block 325, however, it is determined that envelope 110 is at old address plant 140, subroutine 210 advances to stage 340 where delivery system 130 recognizes that envelope 110 is bound for recipient 155 who has changed addresses.

After delivery system 130 recognizes that envelope 110 is bound for recipient 155 who has changed addresses in stage 340, the subroutine advances to stage 345 where envelope 110 is placed in computerized forwarding system. The computerized forwarding system (not shown) associates envelope 110 with recipient's new address 160 from data contained in a recipient's change-of-address record as submitted to the system operator. While this embodiment contemplates envelope 110 passing through old address plant 140, the recognition by delivery system 130 that envelope 110 is bound for recipient 155 who has changed addresses can be performed at any plant within delivery system 130 and is not specifically limited to old address plant 140. Once envelope 110 is placed in computerized forwarding system in stage 345, subroutine 210 continues to stage 350 where envelope 110 is routed in delivery system 130 toward new address 160.

This routing comprises routing envelope 110 from plant to plant within delivery system 130 wherein envelope 110 efficiently converges on new address plant 145. New address plant 145 is the plant within delivery system 130 that serves new address 160. Throughout this process, the delivery system continues to track the progress of the items through delivery system 130, generating a data set containing tracking information as previously described.

After envelope 110 is routed in delivery system 130 toward new address 160 in stage 350, subroutine 210 advance to decision block 360 where it is determined if envelope 110 is at new address plant 145. This is done at each plant traversed by envelope 110 during the routing process. If envelope 110 is not at new address plant 145, subroutine 210 repeats stage 350 and continues to route envelope 110 toward new address 160. If at decision block 360, however, it is determined that envelope 110 is at new address plant 145, subroutine 210 advances to stage 365 where envelope 110 is delivered from new address plant 145 to recipient 155. From stage 365 subroutine 210 returns to subroutine 220 of FIG. 2

System Operator Receives the Results of the Survey and Process Indicators

Turning now to FIG. 4, exemplary subroutine 220 from FIG. 2 will be described, in which the system operator receives the results of survey 105 and the process indicators. Again, the process indicators are the data corresponding to all the tracking information for a particular item designated by its tracking indicia. Subroutine 220 begins at starting block 405 and advances to stage 410 where recipient 155 receives envelope 110. After recipient 155 receives envelope 110 in stage 410, subroutine 220 advances to stage 415 where recipient 155 completes survey 105 by responding to the questions posed in survey 105, thus generating a second data set.

Once recipient 155 completes survey 105 in stage 415, subroutine 220 advances to stage 420 where recipient 155 sends completed survey 105 to the system operator. Sending completed survey 105 to the system operator may be done using, for example, regular mail, e-mail, facsimile, the internet, or an interactive voice response system. An interactive voice response system (IVR) is an automated telephone answering system that responds with a voice menu and allows the user to make choices and enter information via the telephone keypad. IVR systems are widely used in call centers as well as a replacement for human switchboard operators. The system may also integrate database access and fax response. Those skilled in the art, however, will appreciate that many other ways of sending completed survey 105 to the system operator. No matter how completed survey 105 (constituting a second data set) is sent to the system operator, the tracking indicia (constituting a first data set) is also communicated. The first and second data sets may be sent to systems operator either simultaneously or at different times by different mechanisms. However, in every case the first and second data sets include mechanisms for associating them with the specified survey forwarding procedure.

After recipient 155 sends survey 105 to the system operator in stage 420, subroutine 220 continues to stage 425 where the system operator receives survey 105. Once the system operator receives survey 105 in stage 425, subroutine 220 advances to stage 430 where the system operator receives the process indicators corresponding to survey 105. The process indicator may be forwarded directly to the system operator from the particular automated operators or sorters within the given plants that handled envelop 110 in delivery system 130 during the delivery process. This forwarding of the process indicators to the system operator my be accomplished by electronic means. The aforementioned electronic means may include e-mail, the Internet, or a computer network. The computer network may comprise the situation in which the particular automated operators or sorters within the given plants that handled the envelop 110 in delivery system 130, are operated in a networked environment using logical connections to one or more of the automated operators or sorters. The network may be controlled by a remote computer system which may in turn comprise a server, a router, a peer device or other common network node. After the system operator receives the process indicators corresponding to survey 105, subroutine 220 returns to subroutine 230 of FIG. 5.

Survey Results and Process Indicators are Analyzed

Turning now to FIG. 5, exemplary subroutine 230 from FIG. 2 will be described, in which survey 105 results and the process indicators are analyzed. Survey 105 results have captured recipient satisfaction data specific to the recent forwarding experience. The process indicators are generated by the survey's tracking indicia as survey 105 moved through the delivery system. Subroutine 230 begins at starting block 505 and advances to stage 510 where survey 105 results are compared with the process indicators. The concept applied in the comparison is to take information about a recipient's subjective experience of the forwarding service and then match this with the actual movement of the item through delivery system 130. From this comparison, it can be seen how the two data (survey 105 results and the process indicators) correlate and how well the recipient's experience is mirrored in the actual performance of delivery system 130.

Preferred systems and methods of the present invention use a personal computer or other similar microcomputer-based equipment in implementing a processor in which survey 105 results are compared with the process indicators. However, those skilled in the art will appreciate the processor may comprise any type of computer such as hand-held devices, multiprocessor systems, microprocessor-based or programmable consumer electronics, minicomputers, mainframe computers, and the like. The processor may also be practiced in distributed computing environments where tasks are performed by remote processing devices.

After survey 105 results are compared with the process indicators in stage 510, subroutine 230 continues to decision block 515 where it is determined if the recipient's expectations were met. If it is determined at decision block 515 that the recipient's expectations were met, subroutine 230 returns to stage 240 of method 200 as shown in FIG. 2, however, if it is determined at decision block 515 that the recipient's expectations were not met, subroutine 230 advances to stage 520 where the system operator considers adjusting delivery system 130 according to recipients expectations. Survey 105 results and the process indicators allow the system operator to correlate the customer's subjective experience with the actual experience of forwarding based on the movement of the item through delivery system 130. The system operator can therefore determine whether recipient's expectations are different from the reality of their experience or from published performance expectations. For example, assume that the system operator considers a satisfactory forwarding procedure to result in delivery within five days. If the recipient in fact received the item in five days, but the recipient's perceived experience is that the forwarding process took too long, then the system operator can adjust its service criteria accordingly.

For another example, assume that the recipient reports in the survey that they are dissatisfied with the time required for the forwarding process. To the extent that forwarding procedures in delivery system 130 result in a delivery time consistent with the service operator's service expectations, this demonstrates a gap between recipient's expectations and service level criteria of the delivery system operator. The system operator could address this situation with a combination of education, training, and procedural refinements to reduce the operational windows to correspond to the recipient's expectations. In any event, survey 105 results linked to the recipient's actual forwarding experience as submitted, and the performance of forwarded survey 105, will give the system operator a more comprehensive view of the overall performance of delivery system 130.

Once the system operators considers adjusting delivery system 130 according to the recipient's expectations in stage 520, subroutine 230 returns to stage 240 of method 200 as shown in FIG. 2.

In view of the foregoing, it will be appreciated that the present invention provides a system and method for testing a delivery system. Still, it should be understood that the foregoing relates only to the exemplary embodiments of the present invention, and that numerous changes may be made thereto without departing from the spirit and scope of the invention as defined by the following claims.

We claim:

1. A method for analyzing performance of a delivery system using a survey addressed to a user of the delivery system and comprising questions associated with the delivery system, wherein the survey includes indicia for monitoring progress of the survey while transported through the delivery system, comprising:
    detecting, by automation equipment associated with the delivery system, the indicia as the survey is transported through the delivery system;
    storing, in a computer associated with the delivery system, at least one process indicator when the indicia is detected, the process indicator indicating the movement of the survey through the delivery system;
    generating, by the computer, a first data set comprising a set of process indicators corresponding to the indicia and stored upon detection of the indicia;
    receiving, by the computer, a second data set comprising responses to the questions, the second data set supplied by the user;
    analyzing, by the computer, the first data set and the second data set to determine at least one correlation between the responses to the questions and the set of process indicators; and
    providing, to an operator of the delivery system via a display associated with the computer, the at least one correlation.

2. The method of claim 1, wherein the survey comprises questions associated with a forwarding service.

3. The method of claim 1, wherein the delivery system is configured to deliver a mailpiece.

4. The method of claim 1, further comprising:
    sending the survey through the delivery system, the survey bearing an old address of a recipient; and
    forwarding the survey to a new address of the recipient.

5. The method of claim 1, further comprising adjusting the delivery system based upon the analyzing step.

6. The method of claim 1, wherein the first data set comprises a plurality of time and location values.

7. The method of claim 1, wherein the indicia comprises a bar code.

8. The method of claim 1, wherein the second data set further comprises recipient satisfaction data representing a level of satisfaction of the user with the delivery system.

9. The method of claim 8, wherein the analyzing further comprises correlating the recipient satisfaction data with the first data set.

10. The method of claim 1, wherein the analyzing further comprises calculating an elapsed time between input of the survey in the delivery system and delivery of the survey to the user.

11. A system for analyzing performance of a delivery system, comprising:
    automation equipment for scanning a tracking indicia associated with a survey as the survey is transported through the delivery system to a user, the survey comprising questions associated with performance of the delivery system wherein the delivery system generates a first data set comprising information about the transportation of the survey through the delivery system;
    computer configured to:
        analyze survey results received and the first data set;
        determine at least one correlation between the received survey results and the first data set; and
        output at least one correlation; and
    a display associated with the computer for displaying the at least one correlation.

12. The system of claim 11, wherein the controller computer calculates an elapsed time between when the survey was placed in the delivery system and when the survey was received by the user.

13. The system of claim 11, wherein the delivery system is adjusted based upon a comparison of the survey results and the first data set.

14. The system of claim 11, wherein the survey further comprises questions for obtaining data about a forwarding service of the delivery system.

15. The system of claim 11, wherein the delivery system delivers a mailpiece.

16. The system of claim 11, wherein the survey bears an old address of a recipient and the delivery system comprises means for forwarding the survey to a new address of the recipient.

17. The system of claim 11, wherein the indicia comprises a bar code.

18. The system of claim 11, wherein the first data set further comprises a plurality of time and location values.

19. The system of claim 11, wherein the survey results further comprise recipient satisfaction data representing a recipient's level of satisfaction with the delivery system.

20. The system of claim 19, wherein the computer correlates the recipient satisfaction data with the first data set.

* * * * *

UNITED STATES PATENT AND TRADEMARK OFFICE
CERTIFICATE OF CORRECTION

| | | |
|---|---|---|
| PATENT NO. | : 7,827,048 B2 | Page 1 of 1 |
| APPLICATION NO. | : 10/362123 | |
| DATED | : November 2, 2010 | |
| INVENTOR(S) | : James D. Wilson et al. | |

It is certified that error appears in the above-identified patent and that said Letters Patent is hereby corrected as shown below:

Claim 12, column 8, line 56: delete "controller" before --computer--.

Signed and Sealed this
Fifteenth Day of February, 2011

David J. Kappos
*Director of the United States Patent and Trademark Office*